(12) United States Patent
Tagawa et al.

(10) Patent No.: US 10,812,009 B2
(45) Date of Patent: Oct. 20, 2020

(54) MOTOR DRIVING DEVICE AND ABNORMAL HEAT GENERATION DETECTING METHOD FOR MOTOR DRIVING DEVICE

(71) Applicant: FANUC CORPORATION, Yamanashi (JP)

(72) Inventors: Takaaki Tagawa, Yamanashi-ken (JP); Shinichi Horikoshi, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/372,981

(22) Filed: Apr. 2, 2019

(65) Prior Publication Data

US 2019/0312542 A1    Oct. 10, 2019

(30) Foreign Application Priority Data

Apr. 4, 2018    (JP) .................................. 2018-072046

(51) Int. Cl.
*H02P 29/68*    (2016.01)
*H02P 27/06*    (2006.01)

(52) U.S. Cl.
CPC .............. *H02P 29/68* (2016.02); *H02P 27/06* (2013.01)

(58) Field of Classification Search
CPC .................................. H02P 29/68; H02P 27/06
USPC ......................................... 318/472, 471, 445
See application file for complete search history.

(56) References Cited

U.S. PATENT DOCUMENTS 5,723,967 A *  3/1998  Hongo ...................... H02P 6/21
                                                 318/400.11
9,712,071 B2 *  7/2017  Yuasa .................... H02M 5/458
9,899,951 B2 *  2/2018  Lee .......................... H02P 21/18

FOREIGN PATENT DOCUMENTS

| JP | 2000184584 A | 6/2000 |
| JP | 2013-207812 A | 10/2013 |
| JP | 2014064435 A | 4/2014 |
| JP | 2014075949 A | 4/2014 |
| JP | 2016005317 A | 1/2016 |
| WO | 2013175597 A1 | 11/2013 |

* cited by examiner

*Primary Examiner* — David Luo
(74) *Attorney, Agent, or Firm* — Robert P. Michal, Esq.; Carter, DeLuca & Farrell LLP

(57) ABSTRACT

A motor driving device includes a heat sink, a rectifier provided on the heat sink and configured to rectify an AC voltage supplied from an AC power supply to a DC voltage, a charging resistor provided on the heat sink and configured to be used for charging a smoothing capacitor for smoothing the DC voltage rectified by the rectifier, and a temperature sensor with which the charging resistor is provided.

11 Claims, 3 Drawing Sheets

MOTOR DRIVING DEVICE AND ABNORMAL HEAT GENERATION DETECTING METHOD FOR MOTOR DRIVING DEVICE

CROSS-REFERENCE TO RELATED APPLICATION

This application is based upon and claims the benefit of priority from Japanese Patent Application No. 2018-072046 filed on Apr. 4, 2018, the contents of which are incorporated herein by reference.

BACKGROUND OF THE INVENTION

Field of the Invention

The present invention relates to a motor driving device for driving a motor and an abnormal heat generation detecting method for a motor driving device.

Description of the Related Art

In the motor driving device, heat generating components such as rectifiers for converting alternating-current (AC) voltage supplied from an AC power supply into direct-current (DC) voltage are provided, and countermeasures are taken to prevent the heat generating components from burning out due to abnormal heat generation.

For example, Japanese Laid-Open Patent Publication No. 2013-207812 discloses a protecting device for preventing a motor from burning out due to abnormal heat generation, by controlling, based on temperature variation per unit time detected by a temperature sensor provided in an IGBT module, the motor torque so as not to flow a large current through the IGBT module.

SUMMARY OF THE INVENTION

However, the motor driving device includes, in addition to the IGBT module, multiple heat generating components, and if one temperature sensor is provided for each of the heat generating components to detect abnormal heat generation, there is concern that the number of temperature sensors increases and the installation space increases accordingly.

It is therefore an object of the present invention to provide a motor driving device capable of detecting abnormal heat generation while reducing the installation space for temperature sensors, as well as providing an abnormal heat generation detecting method for a motor driving device.

According to a first aspect of the present invention, a motor driving device for driving a motor includes: a heat sink; a rectifier provided on the heat sink and configured to rectify an AC voltage supplied from an AC power supply to a DC voltage; a smoothing capacitor configured to smooth the DC voltage rectified by the rectifier; a charging resistor provided on the heat sink and configured to be used for charging the smoothing capacitor during an initial charging period before start of driving the motor; and a temperature sensor with which the charging resistor is provided.

A second aspect of the present invention resides in an abnormal heat generation detecting method for a motor driving device for driving a motor, in which the motor driving device includes: a heat sink; a rectifier provided on the heat sink and configured to rectify an AC voltage supplied from an AC power supply to a DC voltage; a smoothing capacitor configured to smooth the DC voltage rectified by the rectifier; a charging resistor provided on the heat sink and configured to be used for charging the smoothing capacitor during an initial charging period before start of driving the motor; and a temperature sensor with which the charging resistor is provided. The method includes: a first step of stopping the supply of the AC voltage to the rectifier when the temperature detected by the temperature sensor after a lapse of the initial charging period is equal to or higher than a first threshold, and a second step of issuing a notification that abnormal heat generation occurs.

In the present invention, both the charging resistor and the rectifier are provided on the heat sink. Use of the temperature sensor installed in the charging resistor enables detection of abnormal heat generation in both the rectifier and the charging resistor. Therefore, it is possible to suppress the number of temperature sensors and reduce the installation space, as compared with the case where the rectifier and the charging resistor each have a temperature sensor. In addition, the temperature sensor is provided in the charging resistor which is used for a shorter duration and less likely to generate heat, than the rectifier that is continuously used even after the initial charging period. Therefore, it is easy to secure a temperature-sensor installation space that can improve the durability of the temperature sensor. Thus, according to the present invention, it is possible to detect abnormal heat generation while reducing the installation space for the temperature sensor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A motor driving device according to the present invention will be detailed hereinbelow by describing a preferred embodiment with reference to the accompanying drawings.

Embodiment

Figure 1:
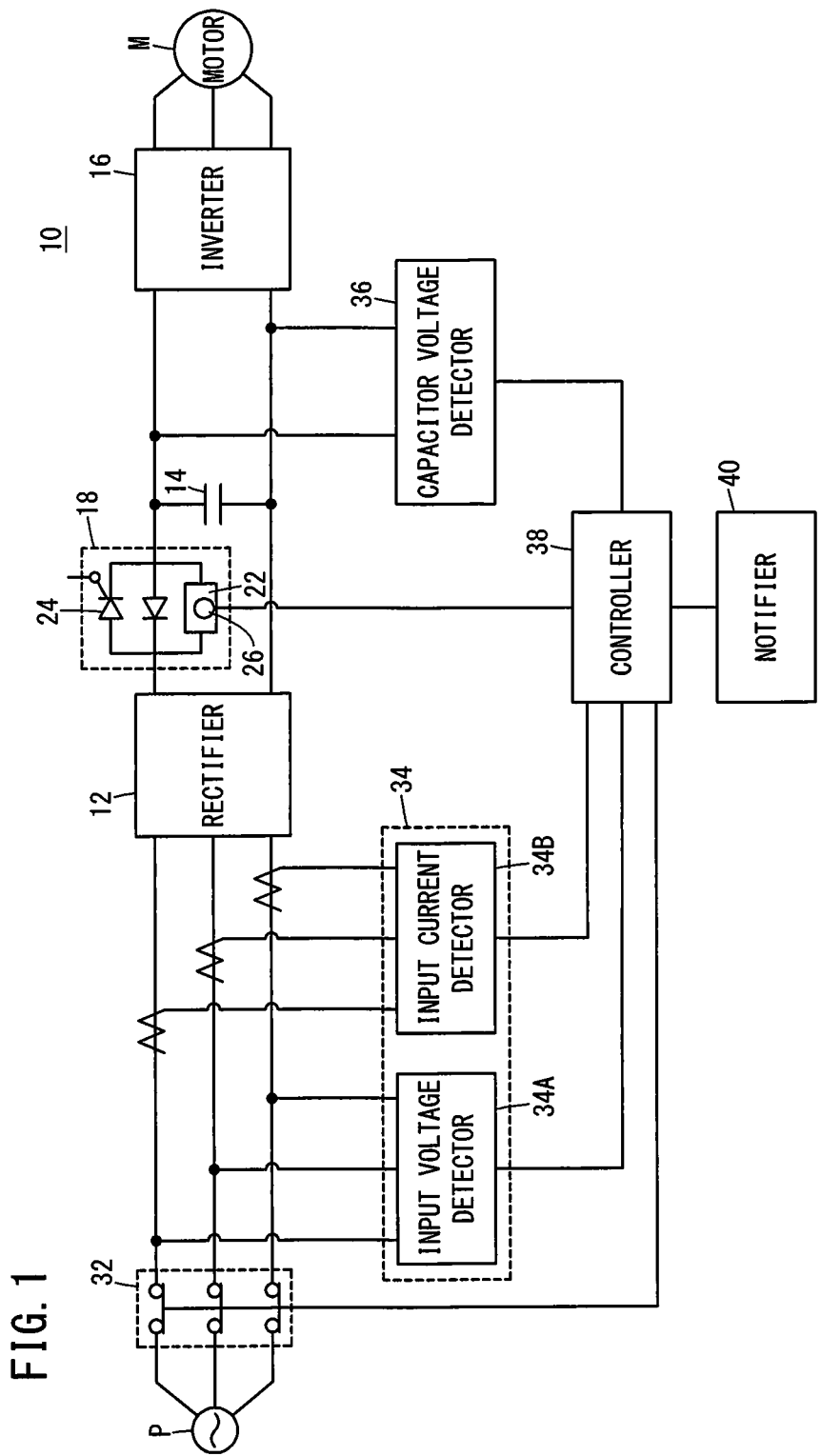
FIG. 1 is a schematic diagram showing a configuration of a motor driving device according to an embodiment.

FIG. 1 is a schematic diagram showing a configuration of a motor driving device 10 according to the embodiment. The motor driving device 10 drives a motor M, by alternating-current (AC) voltage supplied from an AC power supply P. In the present embodiment, the AC power supply P is a three-phase AC power supply.

The motor driving device 10 includes a rectifier 12, a smoothing capacitor 14, an inverter 16 and an initial charger 18. The rectifier 12 converts an AC voltage supplied from the AC power supply P into a DC voltage.

As the rectifier 12, for example, a diode rectifier circuit, a rectifier circuit having a bridge circuit of semiconductor switching elements, or the like can be used. Examples of the semiconductor switching element include an IGBT, a power MOSFET, a bipolar transistor, a thyristor and others.

The smoothing capacitor 14 smoothes the DC voltage converted by the rectifier 12. The inverter 16 converts the capacitor voltage across the smoothing capacitor 14 into an AC voltage for driving the motor M, and outputs the converted AC voltage to the motor M.

The initial charger 18 charges the smoothing capacitor 14 during an initial charging period from the start of input of the AC voltage to the rectifier 12 until the start of the driving of the motor M. The initial charger 18 is arranged between the rectifier 12 and the smoothing capacitor 14.

The initial charger 18 includes a charging resistor 22 and a charging switch 24 connected in parallel with the charging resistor 22.

The charging resistor 22 is a resistor used for charging the smoothing capacitor 14 during the initial charging period, and a temperature sensor 26 is installed inside the charging resistor 22. The charging switch 24 is kept open during the initial charging period and closed during a period other than the initial charging period.

During the initial charging period in which the charging switch 24 is open, in the initial charger 18 DC current supplied from the rectifier 12 flows into the smoothing capacitor 14 through the charging resistor 22 so that the smoothing capacitor 14 is charged. When the smoothing capacitor 14 is charged and the capacitor voltage across the smoothing capacitor 14 reaches a predetermined value, the charging switch 24 is closed and the initial charging operation is completed. When the charging switch 24 is closed, the DC current supplied from the rectifier 12 passes through the charging switch 24 without passing through the charging resistor 22.

As described above, since the initial charger 18 flows the DC current supplied from the rectifier 12 to the smoothing capacitor 14 by way of the charging resistor 22 during the initial charging period, it is possible to prevent flow of an excessive inrush current to the smoothing capacitor 14.

Figure 2:
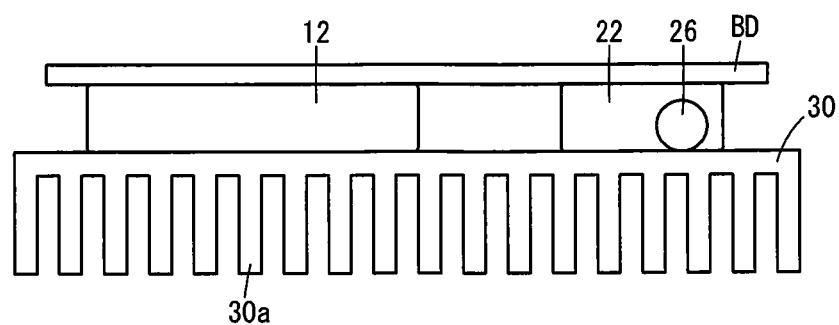
FIG. 2 is a schematic diagram showing how a rectifier and a charging resistor of FIG. 1 are disposed on a heat sink.

As shown in FIG. 2, the rectifier 12 and the charging resistor 22 are provided on a heat sink 30. In the heat sink 30, a side on which the rectifier 12 and the charging resistor 22 are provided is a heat absorption surface, and a large number of radiation fins 30a are provided on a heat radiation surface opposite to the heat absorption surface. A circuit board BD is arranged on the upper side of the rectifier 12 and the charging resistor 22 provided on the heat sink 30. This circuit board BD has the smoothing capacitor 14 and other parts mounted thereon. However, in FIG. 2, the smoothing capacitor 14 is not shown.

As described above, since the charging resistor 22 is provided with the temperature sensor 26, it is possible to detect abnormal heat generation of both the rectifier 12 and the charging resistor 22 on the heat sink 30 with the temperature sensor 26. Therefore, as compared with a case where the temperature sensor 26 is provided for each of the rectifier 12 and the charging resistor 22, the number of temperature sensors 26 can be reduced, and the installation space can be reduced accordingly.

Further, the temperature sensor 26 is installed in the charging resistor 22 which is used for a shorter duration and less likely to generate heat than the rectifier 12 which is continuously used even after the initial charging period. Such an installation space for the temperature sensor can improve the durability of the temperature sensor 26, and can be easily secured in the present embodiment.

Returning to the description of FIG. 1, the motor driving device 10 includes power supply switches 32, an input power detector 34, a capacitor voltage detector 36, a controller 38 and a notifier 40.

The power supply switch 32 is provided between the AC power supply P and the rectifier 12. In the present embodiment, since the AC power supply P is a three-phase AC power supply, the power supply switch 32 is provided for each phase. When the power supply switch 32 is in the closed state, the AC voltage from the AC power supply P is input to the rectifier 12. When the power supply switch 32 is open, the AC voltage supplied from the AC power supply P is not input to the rectifier 12.

The input power detector 34 detects the input power from the AC power supply P to the rectifier 12, and includes an input voltage detector 34A and an input current detector 34B. The input voltage detector 34A detects the input voltage from the AC power supply P to the rectifier 12. In the present embodiment, since the AC power supply P is a three-phase AC power supply, the input voltage detector 34A detects the input voltage of each phase. The input voltage detector 34A outputs the detected input voltage to the controller 38.

The input current detector 34B detects the input current from the AC power supply P to the rectifier 12. In the present embodiment, since the AC power supply P is a three-phase AC power supply, the input current detector 34B detects the input current of each phase. The input current detector 34B outputs the detected input current to the controller 38.

The capacitor voltage detector 36 detects the capacitor voltage across the smoothing capacitor 14 and outputs the detected capacitor voltage to the controller 38.

The controller 38 controls the power supply switches 32 so as to be closed in response to a power supply activation command given from an unillustrated input unit, whereby supply of AC voltage to the rectifier 12 is started. The controller 38 controls the charging switch 24 of the initial charger 18 to be open until a predetermined initial charging period has elapsed after start of input of AC voltage, to thereby charge the smoothing capacitor 14. When the initial charging period has elapsed, the controller 38 keeps the charging switch 24 of the initial charger 18 in a closed state.

After the initial charging period has elapsed, the controller 38 monitors a state of heat generation of the rectifier 12 and the charging resistor 22 based on the temperature detected by the temperature sensor 26. Specifically, the controller 38 monitors the heat generation state by comparing the temperature detected by the temperature sensor 26 with a first threshold.

Here, when the temperature detected by the temperature sensor 26 is equal to or higher than the first threshold, the controller 38 determines that at least one of the rectifier 12 and the charging resistor 22 abnormally heats up, and then opens the power supply switches 32 to stop the supply of AC voltage to the rectifier 12.

In this case, however, from only the temperature detected by the temperature sensor 26, it is not known which of the rectifier 12 and the charging resistor 22 arranged on the heat sink 30 is abnormally generating heat. Therefore, in the present embodiment, the controller 38 determines which one of the rectifier 12 and the charging resistor 22 is abnormally generating heat, based on detection results of the temperature sensor 26, the input power detector 34 and the capacitor voltage detector 36.

Specifically, when the temperature detected by the temperature sensor 26 is equal to or higher than the first threshold and the input power calculated from the input voltage and the input current detected by the input power detector 34 is less than a second threshold, the controller 38 determines that the charging resistor 22 is abnormally generating heat.

On the other hand, when the temperature detected by the temperature sensor 26 is equal to or higher than the first threshold, when the aforementioned input power is equal to or higher than the second threshold, and when the capacitor voltage detected by the capacitor voltage detector 36 is equal to or higher than a third threshold, the controller 38 determines that the rectifier 12 is abnormally generating heat.

When the temperature detected by the temperature sensor 26 is equal to or higher than the first threshold, when the input power is equal to or higher than the second threshold and when the capacitor voltage detected by the capacitor voltage detector 36 is less than the third threshold, the controller 38 determines that the capacitor voltage is low.

In this way, even if the rectifier 12 has no temperature sensor 26, the controller 38 can judge which one of the rectifier 12 and the charging resistor 22 is abnormally generating heat, by using the temperature sensor 26 installed inside the charging resistor 22.

When determining that one of the rectifier 12 and the charging resistor 22 is abnormally generating heat, the controller 38 generates a notify command and gives the generated notify command to the notifier 40. When determining that the capacitor voltage is low, the controller 38 generates a notify command and gives the generated notify command to the notifier 40.

The notifier 40, based on the notify command, issues a notification that abnormal heat generation has been determined by the controller 38. That is, when the controller 38 has determined that the rectifier 12 is abnormally generating heat, the notifier 40 gives a notification that the rectifier 12 is abnormally generating heat. When the controller 38 has determined that the charging resistor 22 is abnormally generating heat, the notifier 40 issues a notification that the charging resistor 22 is abnormally generating heat. Further, when the controller 38 has determined that the capacitor voltage is low, the notifier 40 issues a notification that the capacitor voltage is low.

Specific examples of the notifying method of the notifier 40 include displaying on a display unit, sound generation by generating an alarm sound from a sound generator, light emission of emitted light from a lamp such as a warning lamp and the like. Two or more notifying methods may be used.

Figure 3:
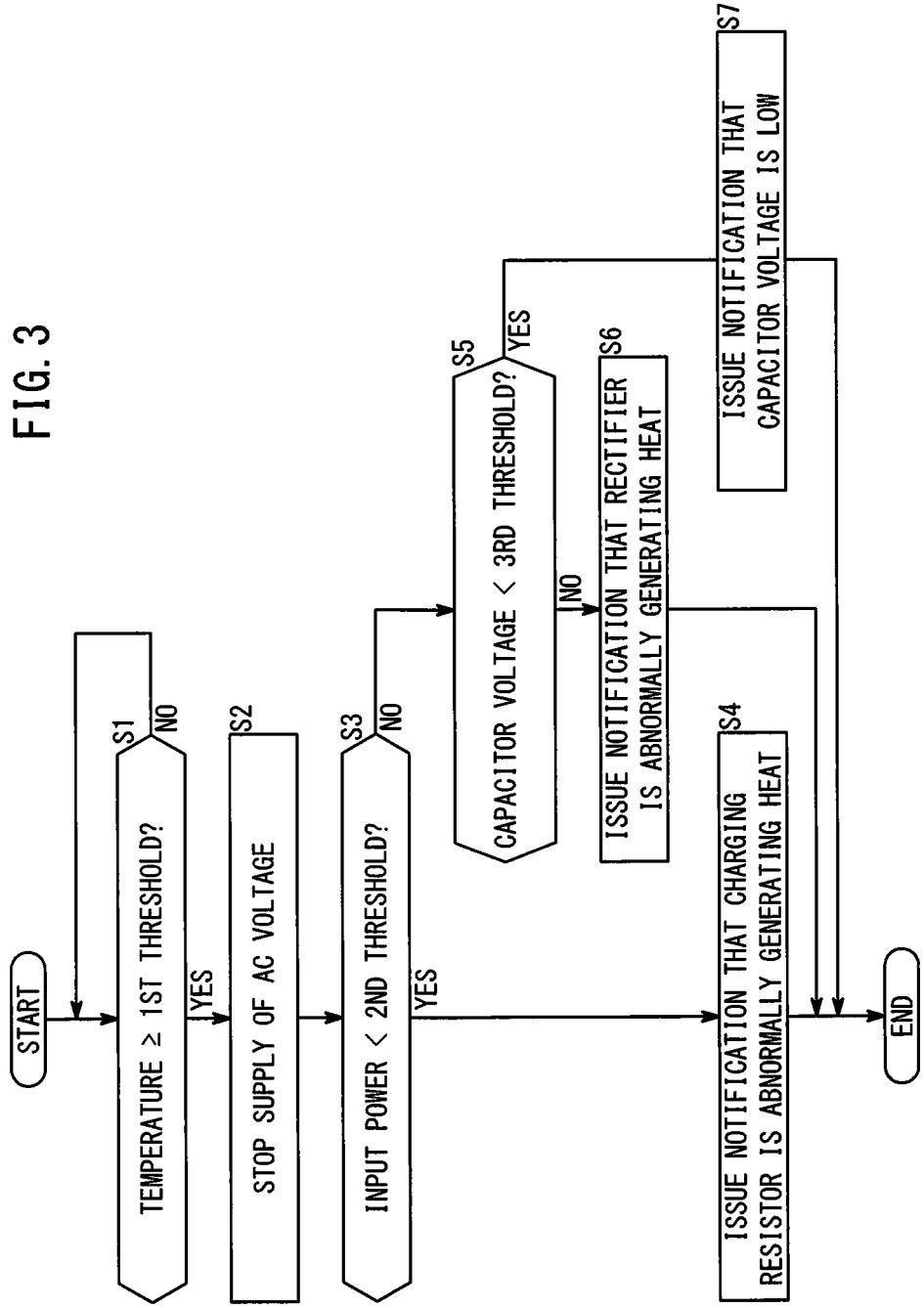
FIG. 3 is a flowchart showing a procedural sequence of a controller relating to an abnormal heat generation detecting method for the motor driving device of FIG. 1.

Next, the abnormal heat generation detecting method for the motor driving device 10 will be described. FIG. 3 is a flowchart showing a procedural sequence of the controller 38 relating to the abnormal heat generation detecting method for the motor driving device 10.

When the initial charging period has elapsed, the controller 38 compares the temperature detected by the temperature sensor 26 with the first threshold at step S1. Here, when the temperature detected by the temperature sensor 26 is less than the first threshold, the controller 38 determines that no abnormal heat generation has occurred and repeats the above comparison at intervals of a predetermined time.

On the other hand, when the temperature detected by the temperature sensor 26 is equal to or higher than the first threshold (the temperature≥1st threshold), the controller 38 determines that at least one of the rectifier 12 and the charging resistor 22 is abnormally generating heat, and the control proceeds to step S2. At step S2, the controller 38 causes the power supply switches 32 to be open (i.e., setting the power supply switches in an open state) to thereby stop the supply of AC voltage to the rectifier 12, and the control proceeds to step S3.

At step S3, the controller 38 calculates the input power based on the input voltage and the input current detected by the input power detector 34, and compares the calculated input power with the second threshold. Here, when the input power is less than the second threshold (the input power<2nd threshold), the controller 38 determines that the charging resistor 22 is abnormally generating heat, and the control proceeds to step S4, where the notifier 40 is caused to issue a notification of that fact.

On the other hand, when the input power is equal to or higher than the second threshold, the controller 38 cannot yet determine which one of the rectifier 12 and the charging resistor 22 is abnormally generating heat, so the control proceeds to step S5, where the controller compares the capacitor voltage detected by capacitor voltage detector 36 with the third threshold.

Here, when the capacitor voltage is equal to or higher than the third threshold, the controller 38 determines that the rectifier 12 is abnormally generating heat, and the control proceeds to step S6, where the notifier 40 is caused to issue a notification of the fact. On the other hand, when the capacitor voltage is less than the third threshold (the capacitor voltage<3rd threshold), the controller 38 determines that the capacitor voltage is low, and the control proceeds to step S7, where the notifier 40 is caused to issue a notification of the fact.

[Modifications]

Though the above embodiment has been described as an example of the present invention, the technical scope of the invention is not limited to that described in the above embodiment. It goes without saying that various modifications and improvements can be added to the above embodiment. It is also apparent from the scope of claims that those added with such modifications and improvements should be incorporated in the technical scope of the invention.

For example, in the above embodiment, the temperature sensor 26 is installed inside the charging resistor 22, but it may be mounted on a surface of the charging resistor 22, for example. That is, the temperature sensor 26 may be provided at any position of the charging resistor 22, regardless of inside or outside. When the temperature sensor 26 is installed inside the charging resistor 22, it is possible to prevent the temperature sensor 26 from being exposed to or coming into contact with external dust and the like. Therefore, even if the motor driving device 10 is used for a machine tool or the like for cutting a workpiece, the temperature sensor 26 is unlikely to be affected by cutting fluid, cutting chips, etc., and can stably detect the temperature.

Though in the above embodiment a thyristor is applied as the charging switch 24, a semiconductor switching element other than the thyristor may be applied, or a mechanical switch may be applied. That is, the specific type of the charging switch 24 is not particularly limited. Similarly, the specific type of the power supply switches 32 is not particularly limited.

Further, in the above-described embodiment, one motor M is provided, but multiple motors M may be provided. In the case where multiple motors M are provided, as many inverters 16 as the motors are connected in parallel with each other and connected downstream of the rectifier 12.

It should be noted that the initial charger 18 and the smoothing capacitor 14 are shared by the inverters 16. However, the smoothing capacitor 14 may be arranged between each of the inverters 16 and the rectifier 12. In this case, the capacitor voltage detector 36 is provided for each of the smoothing capacitors 14.

[Technical Ideas]

Technical ideas that can be grasped from the embodiment and the modifications are described below.

The motor driving device (10) is a device for driving a motor (M). The motor driving device (10) includes: a heat sink (30); a rectifier (12) provided on the heat sink (30) and configured to rectify an AC voltage supplied from an AC power supply (P) to a DC voltage; a smoothing capacitor (14) configured to smooth the DC voltage rectified by the rectifier (12); a charging resistor (22) provided on the heat sink (30) and configured to be used for charging the smoothing capacitor (14) during an initial charging period before start of driving the motor (M); and a temperature sensor (26) with which the charging resistor (22) is provided.

In this motor driving device (10), both the rectifier (12) and the charging resistor (22) are provided on the heat sink (30). Use of the temperature sensor (26) with which the charging resistor (22) is provided enables detection of abnormal heat generation in both the rectifier (12) and the charging resistor (22). Therefore, it is possible to suppress the number of temperature sensors (26), as compared with the case where the rectifier (12) and the charging resistor (22) each have a temperature sensor (26). In addition, the temperature sensor (26) is provided in the charging resistor (22), which is used for a shorter duration than the rectifier (12) and less likely to generate heat than the rectifier (12) that is continuously used even after the initial charging period. The installation space for the temperature sensor (26) is less restricted so that it is possible to improve design flexibility for installing the temperature sensor (26). Thus, it is possible to detect abnormal heat generation while reducing the installation space for the temperature sensor (26).

The motor driving device (10) may further include: a controller (38) configured to determine that at least one of the rectifier (12) and the charging resistor (22) is abnormally generating heat when the temperature detected by the temperature sensor (26) after a lapse of the initial charging period is equal to or higher than a first threshold, and then stop the supply of the AC voltage to the rectifier (12); and a notifier (40) configured to issue a notification that abnormal heat generation occurs. This configuration makes it possible to give the operator an opportunity to identify the cause of abnormal heat generation while avoiding continuation of abnormal heat generation.

The motor driving device (10) may further include an input power detector (34) configured to detect the input power supplied from the AC power supply (P) to the rectifier (12), and the controller (38) may be configured to determine that the charging resistor (22) is abnormally generating heat when the temperature is equal to or higher than the first threshold and the input power is less than the second threshold, and the notifier (40) may be configured to issue a notification that the charging resistor (22) is abnormally generating heat. In this configuration, by using the temperature sensor (26) with which the charging resistor (22) is provided, it is possible to correctly identify, among the rectifier (12) and the charging resistor (22) provided on the heat sink (30), that the charging resistor (22) is abnormally generating heat, and issue a notification of the fact.

The motor driving device (10) may further include a capacitor voltage detector (36) configured to detect the capacitor voltage across the smoothing capacitor (14), and the controller (38) may be configured to determine that the rectifier (12) is abnormally generating heat when the temperature is equal to or higher than the first threshold, the input power is equal to or higher than the second threshold and the capacitor voltage is equal to or higher than the third threshold, while the notifier (40) may be configured to issue a notification that the rectifier (12) is abnormally generating heat. In this configuration, by using the temperature sensor (26) installed in the charging resistor (22), it is possible to correctly detect, among the rectifier (12) and the charging resistor (22) provided on the heat sink (30), that the rectifier (12) is abnormally generating heat, and issue a notification of the fact.

The controller (38) may be configured to determine that the capacitor voltage is low when the temperature is equal to or higher than the first threshold, the input power is equal to or higher than the second threshold and the capacitor voltage is less than the third threshold, and the notifier (40) may be configured to issue a notification that the capacitor voltage is low. This makes it possible to correctly detect that the capacitor voltage is low, by means of the temperature sensor (26) installed in the charging resistor (22), and issue a notification of the fact.

The motor driving device (10) may further include a power supply switch (32) provided between the AC power supply (P) and the rectifier (12), and the controller (38) may be configured to stop the supply of the AC voltage to the rectifier (12) by setting the power supply switch (32) in an open state.

The motor driving device (10) may further include a charging switch (24) connected in parallel with the charging resistor (22), and the controller (38) may be configured to set the charging switch (24) in an open state during the initial charging period and close the charging switch (24) after a lapse of the initial charging period.

An abnormal heat generation detecting method is a method for detecting abnormal heat generation of a motor driving device (10) for driving a motor (M). The motor driving device (10) includes: a heat sink (30); a rectifier (12) provided on the heat sink (30) and configured to rectify an AC voltage supplied from an AC power supply (P) to a DC voltage; a smoothing capacitor (14) configured to smooth the DC voltage rectified by the rectifier (12); a charging resistor (22) provided on the heat sink (30) and configured to be used for charging the smoothing capacitor (14) during an initial charging period before start of driving the motor (M); and a temperature sensor (26) with which the charging resistor (22) is provided. The abnormal heat generation detecting method includes: a first step of stopping the supply of the AC voltage to the rectifier (12) when the temperature detected by the temperature sensor (26) after a lapse of the initial charging period is equal to or higher than a first threshold, and a second step of issuing a notification that abnormal heat generation occurs.

In this abnormal heat generation detection method, both the rectifier (12) and the charging resistor (22) are provided on the heat sink (30). Use of the temperature sensor (26) with which the charging resistor (22) is provided enables detection of abnormal heat generation in both the rectifier (12) and the charging resistor (22). Therefore, it is possible to suppress the number of temperature sensors (26), as compared with the case where the rectifier (12) and the charging resistor (22) each have a temperature sensor (26). In addition, the temperature sensor (26) is provided in the charging resistor (22), which is used for a shorter duration and less likely to generate heat, than the rectifier (12) that is continuously used even after the initial charging period. The installation space for the temperature sensor (26) is less restricted so that it is possible to improve design flexibility in installing the temperature sensor (26). Thus, it is possible to detect abnormal heat generation while reducing the installation space for the temperature sensor (26).

The first step may determine that the charging resistor (22) is abnormally generating heat when the temperature is equal to or higher than the first threshold and the input power supplied from the AC power supply (P) to the rectifier (12) is less than the second threshold, and the second step may issue a notification that the charging resistor is abnormally generating heat. With this configuration, by using the temperature sensor (26) installed in the charging resistor (22), it is possible to correctly identify, among the rectifier (12) and the charging resistor (22) provided on the heat sink (30), that the charging resistor (22) is abnormally generating heat, and issue a notification of the fact.

The first step may determine that the rectifier (12) is abnormally generating heat when the temperature is equal to or higher than the first threshold, the input power is equal to or higher than the second threshold, and the capacitor voltage across the smoothing capacitor (14) is equal to or higher than a third threshold, and the second step may issue a notification that the rectifier (12) is abnormally generating heat. With this configuration, by using the temperature sensor (26) with which the charging resistor (22) is provided, it is possible to correctly detect, among the rectifier (12) and the charging resistor (22) provided on the heat sink (30), that the rectifier (12) is abnormally generating heat, and issue a notification of the fact.

The first step may determine that the capacitor voltage is low when the temperature is equal to or higher than the first threshold, the input power is equal to or higher than the second threshold, and the capacitor voltage is less than the third threshold, and the second step may issue a notification that the capacitor voltage is low. This method makes it possible to correctly detect that the capacitor voltage is low, by means of the temperature sensor (26) installed in the charging resistor (22), and issue a notification of the fact.

What is claimed is:

1. A motor driving device for driving a motor, comprising:
   a heat sink;
   a rectifier provided on the heat sink and configured to rectify an AC voltage supplied from an AC power supply to a DC voltage;
   a smoothing capacitor configured to smooth the DC voltage rectified by the rectifier;
   a charging resistor provided on the heat sink and configured to be used for charging the smoothing capacitor during an initial charging period before start of driving the motor;
   a temperature sensor with which the charging resistor is provided; and
   a controller configured to determine that at least one of the rectifier or the charging resistor is abnormally generating heat when a temperature detected by the temperature sensor after a lapse of the initial charging period is equal to or higher than a first threshold, and then stop supply of the AC voltage to the rectifier.

2. The motor driving device according to claim 1, further comprising a notifier configured to issue a notification that abnormal heat generation occurs.

3. The motor driving device according to claim 2, further comprising an input power detector configured to detect an input power supplied from the AC power supply to the rectifier, wherein:
   the controller is configured to determine that the charging resistor is abnormally generating heat when the temperature is equal to or higher than the first threshold and the input power is less than a second threshold; and
   the notifier is configured to issue a notification that the charging resistor is abnormally generating heat.

4. The motor driving device according to claim 3, further comprising a capacitor voltage detector configured to detect a capacitor voltage across the smoothing capacitor, wherein:
   the controller is configured to determine that the rectifier is abnormally generating heat when the temperature is equal to or higher than the first threshold, the input power is equal to or higher than the second threshold and the capacitor voltage is equal to or higher than a third threshold; and
   the notifier is configured to issue a notification that the rectifier is abnormally generating heat.

5. The motor driving device according to claim 4, wherein:
   the controller is configured to determine that the capacitor voltage is low when the temperature is equal to or higher than the first threshold, the input power is equal to or higher than the second threshold and the capacitor voltage is less than the third threshold; and
   the notifier is configured to issue a notification that the capacitor voltage is low.

6. The motor driving device according to claim 1, further comprising a power supply switch provided between the AC power supply and the rectifier, wherein the controller is configured to stop the supply of the AC voltage to the rectifier by setting the power supply switch in an open state.

7. The motor driving device according to claim 1, further comprising a charging switch connected in parallel with the charging resistor, wherein the controller is configured to set the charging switch in an open state during the initial charging period and close the charging switch after a lapse of the initial charging period.

8. An abnormal heat generation detecting method for a motor driving device for driving a motor, wherein the motor driving device includes:
   a heat sink;
   a rectifier provided on the heat sink and configured to rectify an AC voltage supplied from an AC power supply to a DC voltage;
   a smoothing capacitor configured to smooth the DC voltage rectified by the rectifier;
   a charging resistor provided on the heat sink and configured to be used for charging the smoothing capacitor during an initial charging period before start of driving the motor; and
   a temperature sensor with which the charging resistor is provided,
   the method comprising:
   a first step of stopping supply of the AC voltage to the rectifier when a temperature detected by the temperature sensor after a lapse of the initial charging period is equal to or higher than a first threshold, and
   a second step of issuing a notification that abnormal heat generation occurs.

9. The abnormal heat generation detecting method for the motor driving device according to claim 8, wherein:
   the first step determines that the charging resistor is abnormally generating heat when the temperature is equal to or higher than the first threshold and an input power supplied from the AC power supply to the rectifier is less than a second threshold; and
   the second step issues a notification that the charging resistor is abnormally generating heat.

10. The abnormal heat generation detecting method for the motor driving device according to claim 9, wherein:

the first step determines that the rectifier is abnormally generating heat when the temperature is equal to or higher than the first threshold, the input power is equal to or higher than the second threshold, and a capacitor voltage across the smoothing capacitor is equal to or higher than a third threshold; and the second step issues a notification that the rectifier is abnormally generating heat.

11. The abnormal heat generation detecting method for the motor driving device according to claim 10, wherein:

the first step determines that the capacitor voltage is low when the temperature is equal to or higher than the first threshold, the input power is equal to or higher than the second threshold, and the capacitor voltage is less than the third threshold; and the second step issues a notification that the capacitor voltage is low.

* * * * *